(12) United States Patent
Eagleman (10) Patent No.: US 8,876,341 B2
(45) Date of Patent: Nov. 4, 2014

(54) HEADSET LIGHTING SYSTEM FOR A BICYCLE

(71) Applicant: Erik Eagleman, Freiburg (DE)

(72) Inventor: Erik Eagleman, Freiburg (DE)

(73) Assignee: Cycling Sports Group, Inc., Bethel, CT (US)

( * ) Notice: Subject to any disclaimer, the term of this patent is extended or adjusted under 35 U.S.C. 154(b) by 38 days.

(21) Appl. No.: 13/787,127

(22) Filed: Mar. 6, 2013

(65) Prior Publication Data

US 2014/0254183 A1    Sep. 11, 2014

(51) Int. Cl.
   *B62J 6/00*  (2006.01)
   *B62J 6/02*  (2006.01)

(52) U.S. Cl.
   CPC ..... *B62J 6/00* (2013.01); *B62J 6/02* (2013.01)
   USPC .......................................... 362/473; 362/475

(58) Field of Classification Search
   CPC ................ G62J 6/00; G62J 6/02; G62J 6/16; G62J 2700/00; B60Q 7/00
   USPC ................... 362/473, 475; 340/427
   See application file for complete search history.

(56) References Cited

U.S. PATENT DOCUMENTS

| | | | | |
|---|---|---|---|---|
| 6,533,438 B2 * | 3/2003 | Ter-Hovhannisian | ........ | 362/276 |
| 8,192,061 B2 * | 6/2012 | Waring | ......................... | 362/473 |
| 8,622,595 B2 * | 1/2014 | Chen | ............................. | 362/473 |
| 2010/0053984 A1 * | 3/2010 | Wang | ............................. | 362/474 |
| 2012/0243246 A1 * | 9/2012 | Waring | ......................... | 362/473 |

OTHER PUBLICATIONS

Sparse Press Release "Bay Area Start-Up Brings Passion for Cycling and Design Together in New Product Launch" Sparse press: http://sparse.cc/press, Nov. 8, 2012.

* cited by examiner

*Primary Examiner* — Peggy Neils
(74) *Attorney, Agent, or Firm* — Cantor Colburn LLP (57) ABSTRACT

A light for a bicycle having a head tube is provided. The light includes a body having an opening extending therethrough, the opening sized to receive the head tube, the body further having a recessed area extending about the perimeter of the body. A light emitting device is at least partially disposed within the recessed area. A power source is at least partially disposed within the recessed area and operably coupled to the light emitting device. A cover member is coupled to the body about the recessed area, the cover member being made from a flexible material.

20 Claims, 9 Drawing Sheets

HEADSET LIGHTING SYSTEM FOR A BICYCLE

BACKGROUND OF THE INVENTION

The present disclosure relates generally to a bicycle, and particularly a lighting device for a bicycle.

Bicycling is becoming an increasingly more popular form of recreation as well as a means of transportation. Bicycling has become a very popular competitive sport for both amateurs and professionals. The consequence of the popularity of bicycle riding is a growing presence of bicycle operators or cyclists on public roads or off road trails. Further, as the recreation has grown, typical bicycle excursions or trips have lengthened in extent. This is especially true where operators have used the bicycle as a means for commuting to and from work. As a result, bicycle trips are made at later hours and for extended distances, to the extent that riders now are frequently encountered on the highways or trails at dusk and into nightfall. Further, twenty-four hour off road races or night rides have also been held. It should be appreciated that it is desirable to provide a good light source to aid the operators use and enjoyment of the bicycle.

Typically, lighting is provided by a lamp positioned on the front of the bicycle. These lights may be clamped via a bracket on to the handle bars or the front fork for example. These lights may be powered by a variety of energy sources, such as a dynamo coupled to the front wheel or a battery. This clamp on lighting arrangement provided sufficient light and was easy to install. However, the use of a clamping arrangement often placed the light in a less than desirable area and was not aesthetically pleasing. Further, since the light was extending out from the frame member to which it was attached, the operator had to take care not to damage the light.

In some cases, the light has been integrated directly into a frame member, such as the front suspension or fork for example. These arrangements improved the aesthetic issues of the clamp on light, but at the expense of being difficult to access for repair or replacement of components that become damaged or worn out due to use.

Accordingly, while existing bicycle lighting devices are suitable for their intended purposes, there still remains a need for improvements particularly regarding a compact lighting system that may be integrated with the bicycle headset which is easy for the operator to use and service.

BRIEF DESCRIPTION OF THE INVENTION

A light that can be affixed to a headset of a bicycle being used also as a spacer.

In accordance with an embodiment of the invention, a bicycle is provided that includes a head tube. The light comprises a body having an opening extending therethrough, the opening sized to receive the head tube, the body further having a recessed area extending about the perimeter of the body. A light emitting device is at least partially disposed within the recessed area. A power source is at least partially disposed within the recessed area and operably coupled to the light emitting device. A cover member is coupled to the body about the recessed area, the cover member being made from a flexible material.

In accordance with another embodiment of the invention a bicycle is provided. The bicycle comprises A bicycle a frame and a headset coupled to the frame, the headset having a head tube. A body is provided having an opening extending therethrough, the opening sized to receive the head tube, the body further having a recessed area extending about the perimeter of the body. A light emitting device is at least partially disposed within the recessed area. A power source is at least partially disposed within the recessed area and operably coupled to the light emitting device. A cover member is coupled to the body about the recessed area, the cover member being made from a flexible material.

In accordance with still another embodiment, a headset lighting system is provided for a bicycle having a headtube. The headset lighting device includes a frustoconical shaped body having a first opening sized to receive the head tube, the body having a recessed area extending about its circumference. At least one light emitting diode is at least partially disposed within the recessed area, the at least one light emitting diode being configured to emit light away from the body. A power source is operably coupled to the at least one light emitting diode. A flexible frustoconical shaped cover is disposed about and at least partially within the recessed area, the cover having at least one second opening sized to receive the at least one light emitting diode.

A product is further provided comprising any feature disclosed herein, either explicitly or equivalently, either individually or in combination with any other feature disclosed herein, in any configuration.

Other embodiments of the invention include a product having any feature disclosed herein, explicitly or equivalently, either individually or in combination with any other feature disclosed herein, in any configuration.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention, as shown and described by the various figures and accompanying text, provides a headset lighting system that provides a compact and integrated light for use on a bicycle. While embodiments described herein illustrate the power source for the lighting system as being integral with the lighting system, this is for exemplary purposes and the claimed invention should not be so limited. The power source may be provided by a battery directly coupled to the headset lighting device, or may be a power source that is remote from the lighting device, such as in a power source for driving an electric assist system for example.

Figure 1:
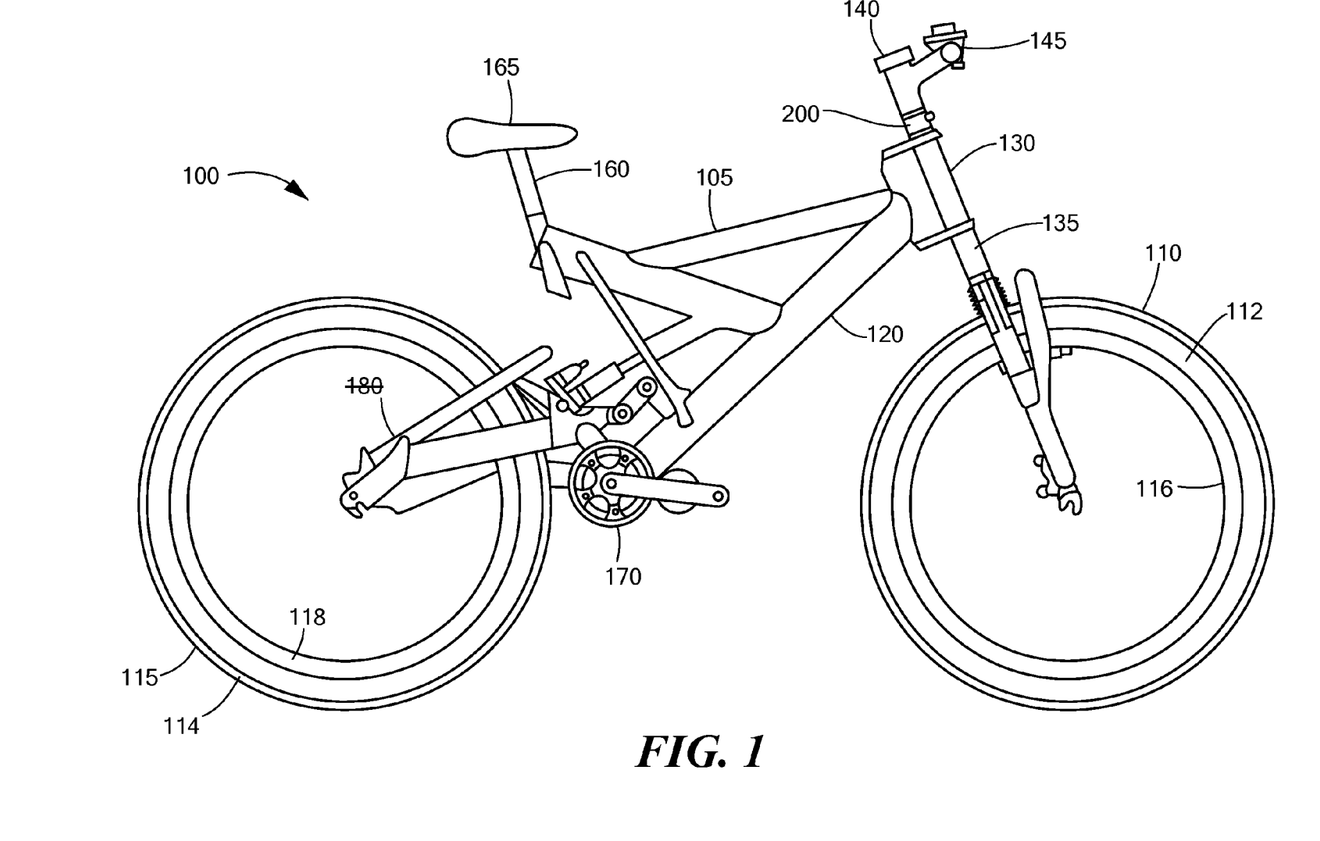
FIG. 1 illustrates a side plan view of an exemplary embodiment of a bicycle in accordance with an embodiment of the invention.
Figure 2:
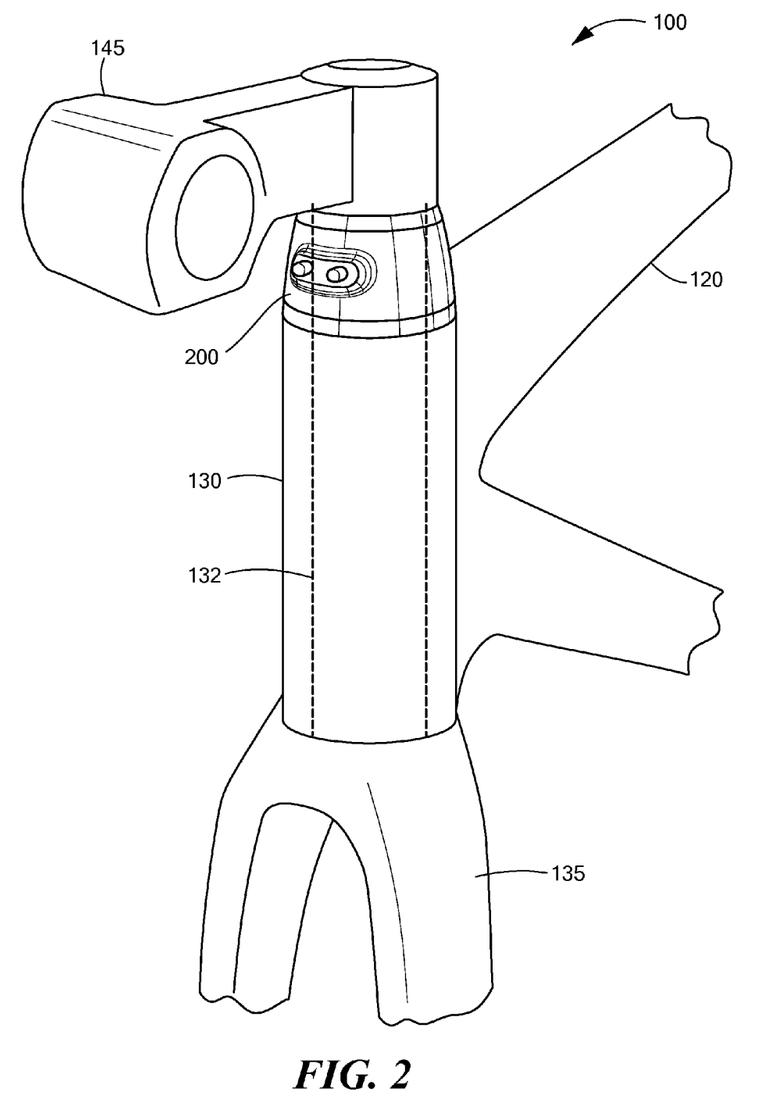
FIG. 2 illustrates a partial isometric view of a portion of the bicycle of FIG. 1.
Figure 3:
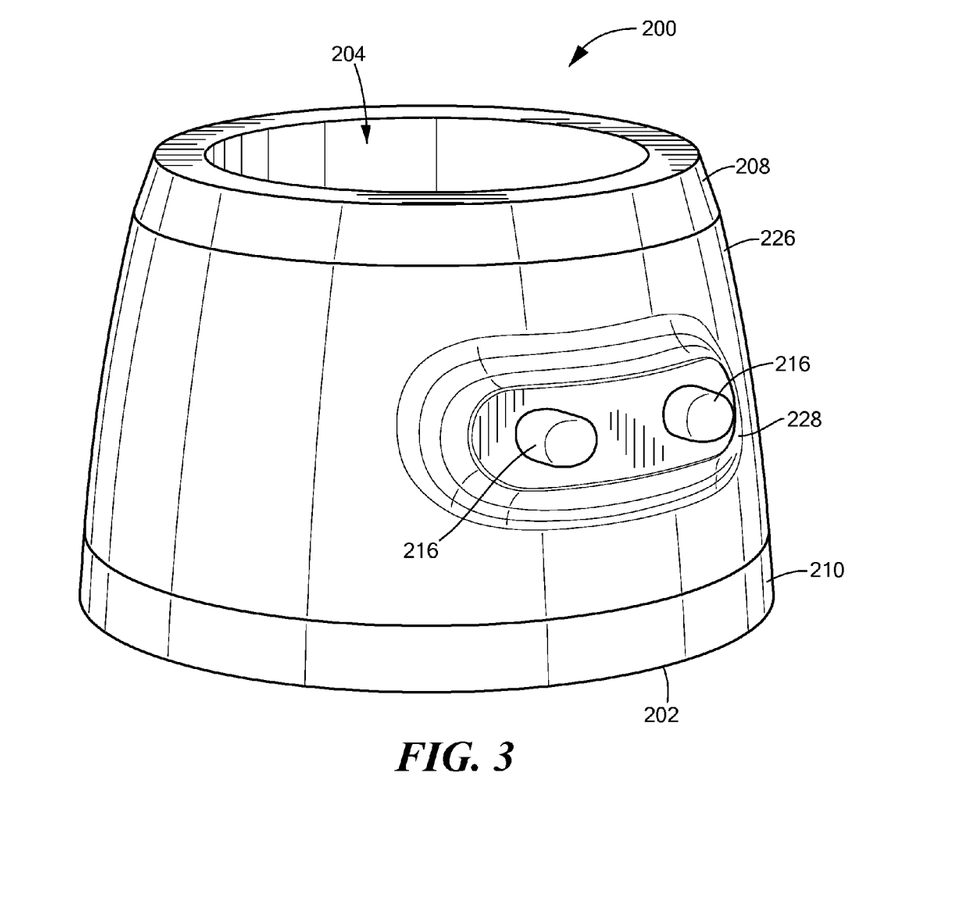
FIG. 3 illustrates an isometric view of the headset lighting device of FIG. 1.
Figure 4:
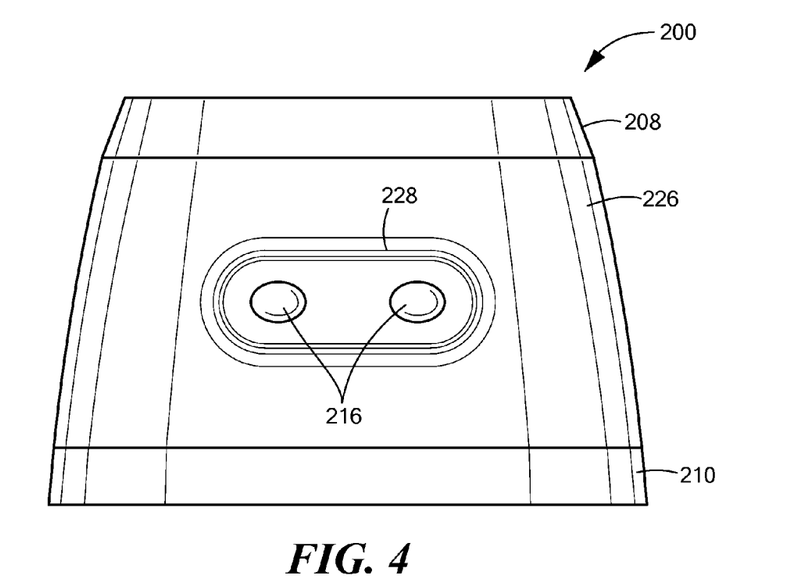
FIG. 4 illustrates a front view of the headset lighting device illustrated in FIG. 3.
Figure 5:
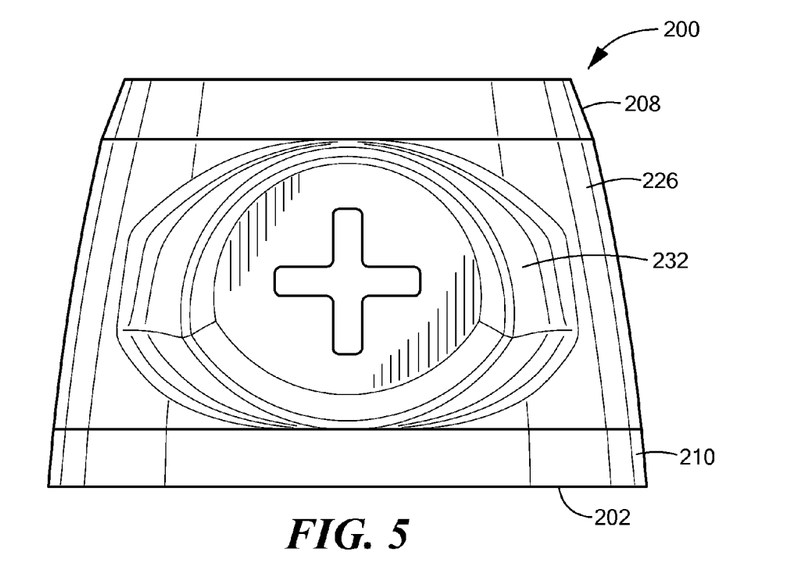
FIG. 5 illustrates a rear view of the headset lighting device illustrated in FIG. 3.
Figure 6:
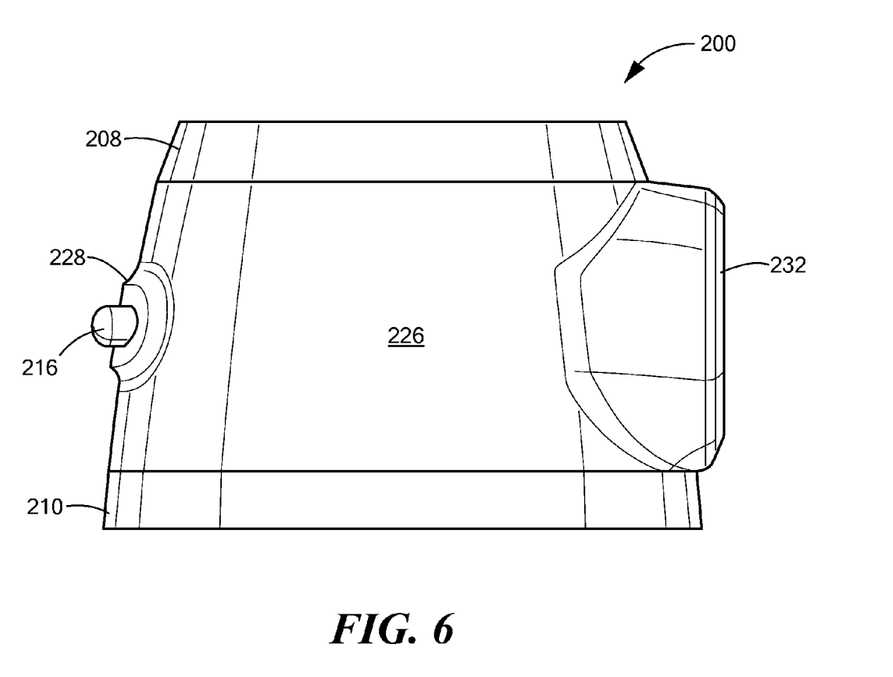
FIG. 6 illustrates a side view of the headset lighting device illustrated in FIG. 3.
Figure 7:
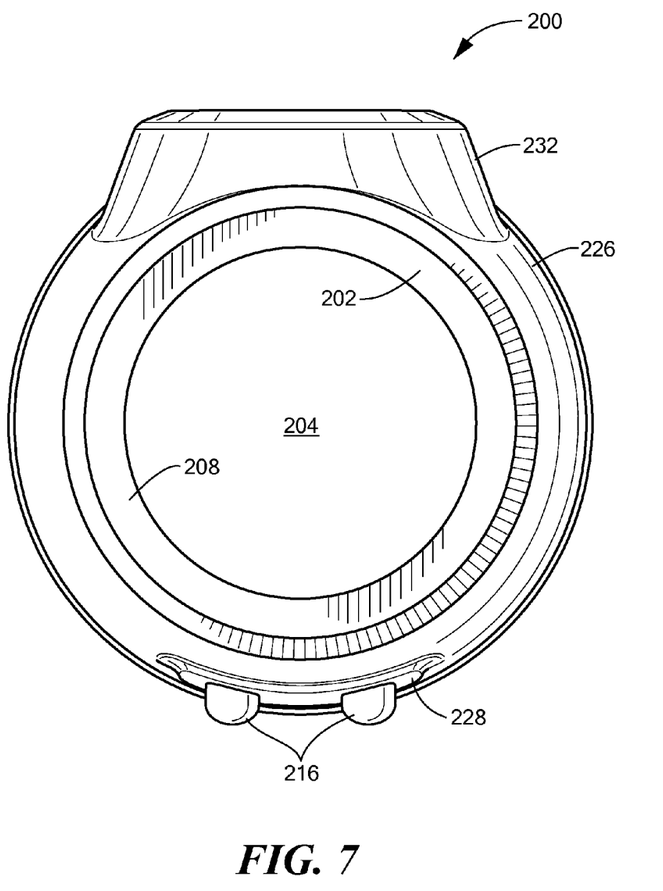
FIG. 7 illustrates top view of the headset lighting device illustrated in FIG. 3.
Figure 8:
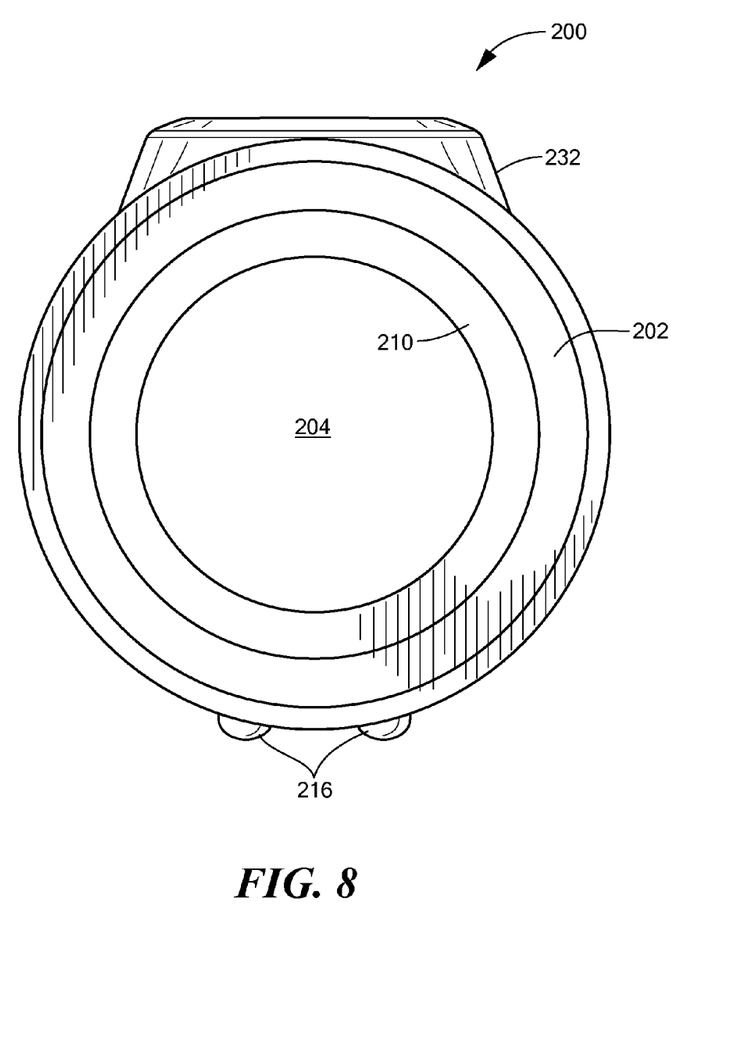
FIG. 8 illustrates a bottom view of the headset lighting device illustrated in FIG. 3.

FIG. 1 is an exemplary embodiment of a bicycle 100 having a bicycle frame 105 configured to receive front 110 and rear 115 wheels. Each wheel includes an inflatable tire 112, 114 which is supported by a rim 116, 118, respectively. The frame 105 includes a front section 120 and a rear section. The front section 120 includes a headset 130 that is configured and dimensioned to receive a suspension system 135. The suspension system 135 couples the front section 120 to the front wheel 110. The headset 130 includes a head tube 132 that also provides a mounting location for a lighting device 200. The lighting device 200 is assembled onto the bicycle 100 by removing the handle bar stem 145 and sliding the lighting device 200 onto the head tube 132. The handle bar stem 145 is then replaced, clamping the lighting device 200 between the handle bar stem 145 and the headset 130.

A handle bar 145 is connected to the head tube 132 to allow the rider to rotate the front wheel 110 via the suspension system 135. The lighting device 200 is configured to remain pointing in the direction of travel when the handle bars 145 are rotated. The handle bar 145 typically has grips and hand brake actuators (not shown). A user interface may be mounted to the handle bar 145. On the opposite end of the frame front section 120, a vertically oriented rear seat support 160 fixedly attached to at least one of the front section 120 and the rear section provides support for seat 165. A crank assembly 170 is mounted to the front section 120 below the seat 165. The crank includes a gear assembly and pedals and is typically coupled to a rear wheel gear assembly (not shown) via a chain or other suitable member.

The rear section is coupled to the front section 120 by a pair of linkages and a rear suspension system. The rear section includes an upper tube 180 and a lower tube that connect the rear wheel 115 to the front section 120. It should be appreciated that the linkages and rear suspension pivot, allowing the rear section to move independently in the same plane as the front section 120. This type of bicycle, sometimes referred to as a full suspension type, provides energy absorption and damping for both wheels 110, 115 of the bicycle 100. In another embodiment, the rear suspension may be omitted, and the rear section would be fixedly attached to the front section 120. It should be appreciated that in some embodiments, the front suspension 135 may also be omitted.

Referring now to FIGS. 3-10, the lighting device 200 will be described. The lighting device 200 includes a body 202 having an opening 204 extending therethrough. In one embodiment, the opening is coaxial with a center axis 206 of the body 202. The body 202 maybe made of any suitable material, such as an injection molded plastic for example. The opening 202 is sized to allow the head tube 132 to pass therethrough. When headset is compressed, the lighting device 200 turns with the handlebars 145 making the lighting track with the road.

In the exemplary embodiment, the body 202 is a frustoconical shape having a first flange 208 and a second flange 210 arranged on each end of the body 202 respectfully. The body 202 further includes a recessed area 212 that extends about the periphery or circumference. The recessed area 212 is defined between the first flange 208 and the second flange 210.

Figure 9:
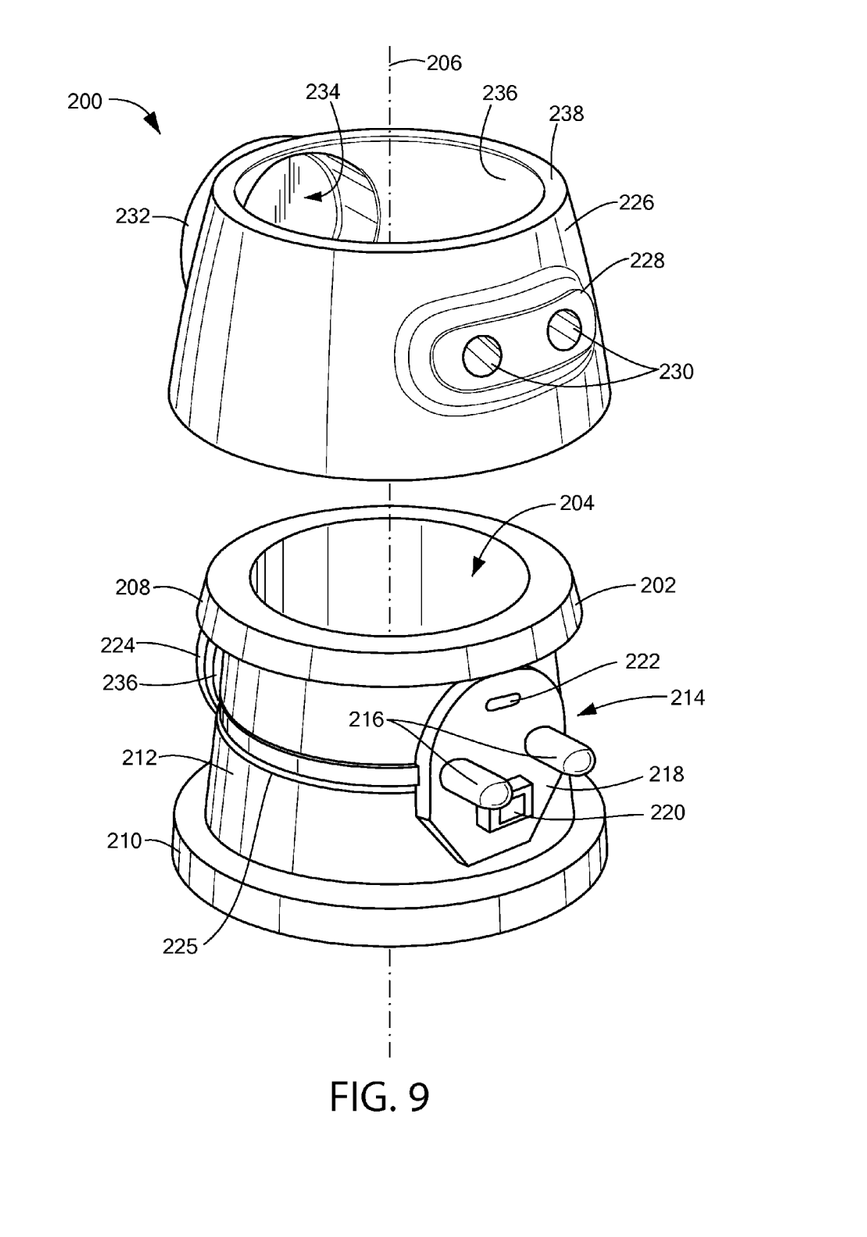
FIG. 9 illustrates an exploded isometric view of the headset lighting device of FIG. 3.

The lighting device 200 further includes a light emitting device 214 at least partially disposed within the recessed area 212. In the exemplary embodiment, the light emitting device 214 includes a pair of light emitting diodes 216. In other embodiments, the light emitting device 214 may have an incandescent, a halogen, a fluorescent, or a xenon lamp for example. The light emitting diodes 216 are coupled to a circuit board 218 that is disposed within the recessed area 212. In one embodiment, a switch 220 is coupled to the circuit board 218. The switch 220 and the circuit board 218 cooperate to change the operation of the light emitting device 214 in response to actuation of the switch 220. For example, actuating the switch 220 once may turn the light emitting device 214 on, actuating a second time may result in the light emitting device 214 flashing or strobing, while actuating the switch 220 a third time may turn the light emitting device 214 off. In the exemplary embodiment, the body 202 further includes a tab 222 within the recessed area 212 that cooperates with a slot in the circuit board 218 to retain the circuit board 218.

Also arranged at least partially within the recessed area 212 is a power source 224. In the exemplary embodiment, the power source 224 is disposed opposite the light emitting device 214. In one embodiment, the power source 224 is a battery, such as a CR2032 type button cell lithium battery for example. The battery 224 is electrically coupled to the circuit board 218 and switch 220 by a conductor 225 to provide electrical power to operate the light emitting device 214.

The lighting device 200 further includes a cover member 226. In the exemplary embodiment, the cover member 226 is made from a flexible material, such as silicone rubber for example. As will be discussed in more detail below, the use of a flexible material allows the battery 224 to be easily and quickly replaced by the operator without having to disassemble the lighting device 200. In the exemplary embodiment, the cover member 226 is a frustoconical shape to generally match the shape of the body 202. It should be appreciated that the cover 226 may have other shapes to provide the desired appearance. The cover member 226 has a generally uniform wall that defines an inside surface 236. A first protrusion 228 extends from one side having a pair of holes 230 sized to allow the light emitting diodes 216 to extend therethrough. In one embodiment, the first protrusion 228 provides additional protection and support along the length of the light emitting diodes 216.

Opposite the first protrusion 228 is a second protrusion 232. The second protrusion 232 has a recessed portion 234 arranged on the inside surface 236. The recessed portion 234 is sized to fit over the battery 224. In one embodiment, the cover member 226 has a lip 238 on one end. The cover member 226 is sized to fit over and cover the recessed area 212. It should be appreciated that the cover member provides advantages in protecting the battery 224, circuit board 218, the switch 220 and light emitting diodes 216 from the environment.

Figure 10:
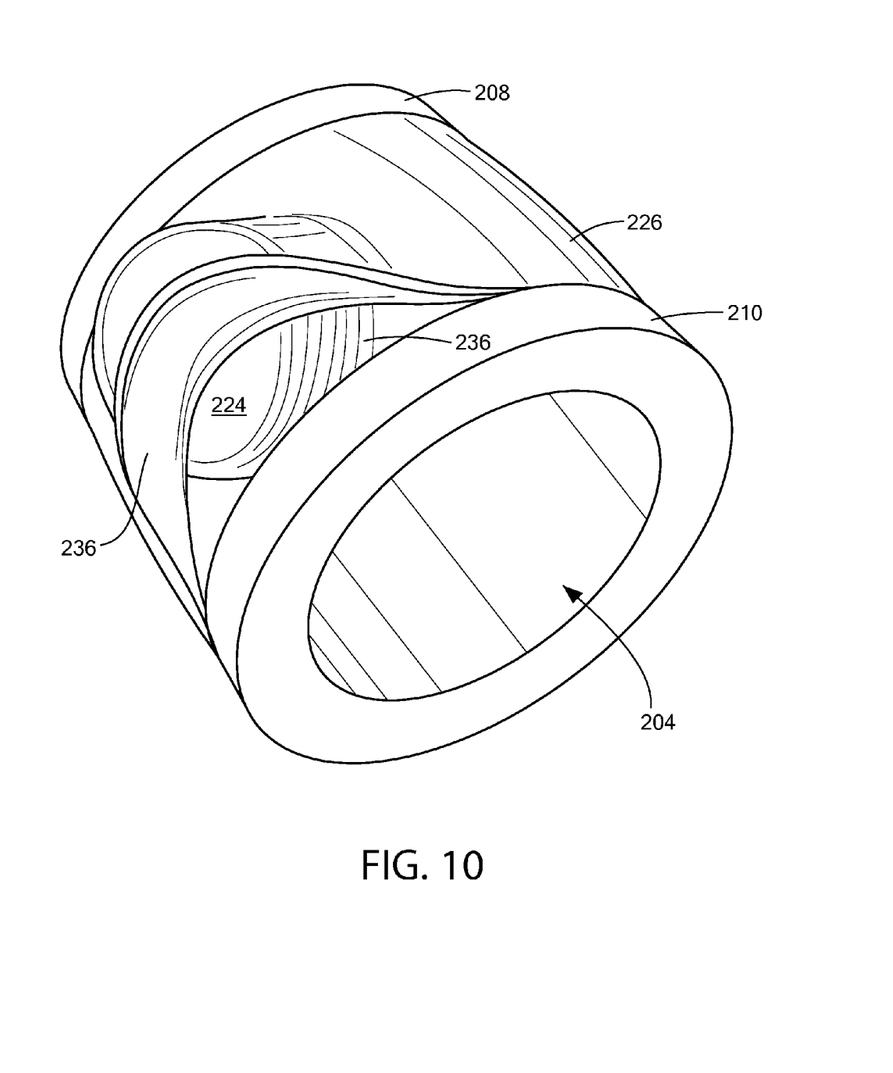
FIG. 10 illustrates an isometric view of the headset lighting device of FIG. 3 with a portion of the cover lifted to reveal a battery, the cover allows access to battery for replacement without removing entire light assembly from the bicycle.

As is shown in FIG. 10, to replace the battery 224, the operator simply lifts or folds the cover member 226 back over itself in the region of the second protrusion 232. Once the battery 224 is exposed, the operator may disconnect the battery 224 from a battery holder 236 and replace it with a new battery. By pressing on the cover member 226 in the area of the switch 220, the operator may turn the lighting device on or off, or change the mode of operation (constant or flashing light).

It should be appreciated that the lighting device disclosed herein may be used with any type of bicycle having a head tube member. As disclosed, some embodiments of the invention may include some of the following advantages: a compact design; easily installed and removed; easily services to replace the battery; and is aesthetically pleasing.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A light for a bicycle having a head tube, the light comprising:
   a body having an opening extending therethrough, the opening sized to receive the head tube, the body further having a recessed area extending about the perimeter of the body;
   a light emitting device at least partially disposed within the recessed area;
   a power source at least partially disposed within the recessed area and operably coupled to the light emitting device; and
   a cover member coupled to the body about the recessed area, the cover member being made from a flexible material.

2. The light of claim 1 further comprising a switch operably coupled between the light emitting device and the power source, the switch being disposed in the recessed area.

3. The light of claim 2 wherein the cover includes at least one hole, the light emitting device being at least partially disposed within the at least one hole.

4. The light of claim 3 wherein the light emitting device includes at least one light emitting diode.

5. The light of claim 4 wherein the power source is a battery.

6. The light of claim 5 wherein the cover includes a recessed portion sized to receive the battery.

7. A bicycle comprising:
   a frame;
   a headset coupled to the frame, the headset having a head tube;
   a body having an opening extending therethrough, the opening sized to receive the head tube, the body further having a recessed area extending about the perimeter of the body;
   a light emitting device at least partially disposed within the recessed area;
   a power source at least partially disposed within the recessed area and operably coupled to the light emitting device; and
   a cover member coupled to the body about the recessed area, the cover member being made from a flexible material.

8. The light of claim 7 further comprising a switch operably coupled between the light emitting device and the power source, the switch being disposed in the recessed area.

9. The light of claim 8 wherein the cover includes at least one hole, the light emitting device being at least partially disposed within the at least one hole.

10. The light of claim 9 wherein the light emitting device includes at least one light emitting diode.

11. The light of claim 10 wherein the power source is a battery.

12. The light of claim 11 wherein the cover includes a recessed portion sized to receive the battery.

13. A headset lighting device for a bicycle having a head tube, the headset lighting device comprising:
   a frustoconical shaped body having a first opening sized to receive the head tube, the body having a recessed area extending about its circumference;
   at least one light emitting diode at least partially disposed within the recessed area, the at least one light emitting diode being configured to emit light away from the body;
   a power source operably coupled to the at least one light emitting diode; and
   a flexible frustoconical shaped cover disposed about and at least partially within the recessed area, the cover having at least one second opening sized to receive the at least one light emitting diode.

14. The headset lighting device of claim 13 wherein the at least one light emitting diode is coupled to a circuit board disposed within the recessed area.

15. The headset lighting device of claim 14 wherein cover includes a recessed portion on an interior surface, the recessed portion being sized to receive the power source.

16. The headset lighting device of claim 15 wherein the power source is a battery.

17. The headset lighting device of claim 16 further comprising a conductor disposed within the recess between the battery and the at least one light emitting diode.

18. The headset lighting device of claim 17 further comprising a switch electrically coupled to the conductor between the battery and the at least one light emitting diode.

19. The headset lighting device of claim 18 wherein the circuit board is configured to cause the light emitting diode to flash in response to an actuation of the switch.

20. The headset lighting device of claim 19 wherein the at least one light emitting diode turns on or off in response to an actuation of the switch.

* * * * *